US005539881A

United States Patent [19]
Hunt et al.

[11] Patent Number: 5,539,881
[45] Date of Patent: Jul. 23, 1996

[54] NETWORK ELEMENT INCLUDING AUTOMATIC NETWORK ELEMENT IDENTITY INFORMATION REGISTRATION APPARATUS AND METHOD

[75] Inventors: Christopher J. Hunt, Howell, N.J.; Christopher S. Welles, Weston, Mass.

[73] Assignee: AT&T Corp., Murray Hill, N.J.

[21] Appl. No.: 990,479

[22] Filed: Dec. 14, 1992

[51] Int. Cl.[6] .............................. G06F 11/00; G06F 11/22
[52] U.S. Cl. .................... 395/200.02; 395/700; 395/500; 364/240.8; 364/927.96
[58] Field of Search .................................... 395/200, 153, 395/700, 500, 200.02; 370/88

[56] References Cited

U.S. PATENT DOCUMENTS

| | | | |
|---|---|---|---|
| 4,644,532 | 2/1987 | George et al. | 370/94 |
| 4,941,084 | 7/1990 | Terada et al. | 364/200 |
| 5,109,484 | 4/1992 | Hughes et al. | 395/200 |
| 5,230,079 | 7/1993 | Grondalski | 395/800 |
| 5,327,424 | 7/1994 | Perlman | 370/85.13 |
| 5,404,524 | 4/1995 | Celi, Jr. | 395/700 |

FOREIGN PATENT DOCUMENTS

| | | | |
|---|---|---|---|
| A 0-310-003 | 9/1988 | European Pat. Off. | H04L 29/06 |

OTHER PUBLICATIONS

ISO/IEC JTC1/SC6 N 7145 "Telecommunications and Information Exchange Between Systems" dated Jan. 20, 1992, pp. 1–150.

ISO/IEC 9542: 1988 E "Information processing systems—Telecommunications and information exchange between systems—End system to Intermediate system routeing exchange protocol for use in conjunction with the Protocol for providing the connectionless–mode network service", pp. 1–31, draft & ballot.

ISO/IEC 8473: 1988 E "Information processing systems—Data communications—Protocol for providing the connectionless–mode network service", pp. 1–51 and 3 page Technical Corrigendum 1, dated Oct. 2, 1992.

(List continued on next page.)

*Primary Examiner*—Thomas C. Lee
*Assistant Examiner*—Rehana Krick
*Attorney, Agent, or Firm*—Thomas Stafford

[57] ABSTRACT

In a telecommunications management network including a network element provisioned as a so-called Directory Services Network Element (DSNE) and at least one sub-network intended to include one or more network elements, automatic registration network element identity information is realized by employing a routing exchange protocol to dynamically maintain identity information of network elements reachable within the network, enhancing the routing exchange protocol interface to automatically supply an indication of detection of a newly reachable network element to an applications layer protocol, and using the indentity information of a newly reachable network element in the applications layer protocol of the DSNE to establish communications with the newly reachable network element. Then, the newly reachable network element supplies additional identity information (e.g., its name, network address and the like) to the DSNE. The DSNE, upon receiving the additional identity information, supplies its identity information to the newly reachable network element. Consequently, the identity information of the DSNE is supplied to each newly reachable network element as it is added to the network. This provides all network elements the capability of establishing communications with the DSNE, so that queries can be made for identity information of other network elements in the sub-network. The retrieved identity information can, in turn, be used by the individual network elements to establish communications with other network elements in the sub-network.

10 Claims, 17 Drawing Sheets

OTHER PUBLICATIONS

CCITT Rec. X.500 (draft revised), "Information Technology—Open Systems Interconnection—The Directory: Overview of Concepts, Models, and Services", pp. 1–24, dated Apr. 1992.

CCITT Rec. X.217 (COM VII–R 46–E) "Draft Recommendations Adopted for Accelerated Approval (X.217)", pp. 1–80, dated 27 Apr. 1992.

CCITT Rec. X.227 (COM VII–R–46–E) "Draft Recommendations Adopted for Accelerated Approval (X.227)", pp. 1–80, dated 27 Apr. 1992.

| NAME (TID) | ADDRESS (NSAP) | SMSB |
|---|---|---|
| DSNE | xy 2744 | ALL |
| A1 | xy 9247 | "A" |
| A2 | xy 7741 | "A" |
| A3 | xy 1012 | "A" |
| B1 | xy 2571 | "B" |
| B2 | xy 3314 | "B" |
| B3 | xy 0241 | "B" |
| B4 | xy 4447 | "B" |
| C1 | xy 5893 | "C" |
| C2 | xy 2727 | "C" |
| C3 | xy 4155 | "C" |
| C4 | xy 6002 | "C" |

FIG.11

| NAME (TID) | ADDRESS (NSAP) |
|---|---|
| DSNE | xy 2744 |
| A1 | xy 9247 |
| A2 | xy 7741 |
| A3 | xy 1012 |

FIG.12

| NAME (TID) | ADDRESS (NSAP) |
|---|---|
| DSNE | xy 2744 |
| B1 | xy 2571 |
| B2 | xy 3314 |
| B3 | xy 0241 |
| B4 | xy 4447 |

FIG.13

| NAME (TID) | ADDRESS (NSAP) |
|---|---|
| DSNE | xy 2744 |
| C1 | xy 5893 |
| C2 | xy 2727 |
| C3 | xy 4155 |
| C4 | xy 6002 |

| NAME (TID) | ADDRESS (NSAP) | SMSB |
|---|---|---|
| DSNE | xy 2744 | ALL |
| A1* | xy 9247 | "A*" |
| A2 | xy 7741 | "A" |
| A3 | xy 1012 | "A" |
| B1* | xy 2571 | "B*" |
| B2 | xy 3314 | "B" |
| B3 | xy 0241 | "B" |
| B4 | xy 4447 | "B" |
| B5 | xy 6972 | "B" |
| C1* | xy 5893 | "C*" |
| C2 | xy 2727 | "C" |
| C3 | xy 4155 | "C" |
| C4 | xy 6002 | "C" |

FIG.19

| NAME (TID) | ADDRESS (NSAP) |
|---|---|
| DSNE | xy 2744 |
| A1* | xy 9247 |

FIG.20

| NAME (TID) | ADDRESS (NSAP) |
|---|---|
| DSNE | xy 2744 |
| A2 | xy 7741 |
| A3 | xy 1012 |

FIG.21

| NAME (TID) | ADDRESS (NSAP) |
|---|---|
| DSNE | xy 2744 |
| B1* | xy 2571 |

FIG.22

| NAME (TID) | ADDRESS (NSAP) |
|---|---|
| DSNE | xy 2744 |
| B2 | xy 3314 |
| B3 | xy 0241 |
| B4 | xy 4447 |
| B5 | xy 6972 |

FIG.23

| NAME (TID) | ADDRESS (NSAP) |
|---|---|
| DSNE | xy 2744 |
| C1* | xy 5893 |

FIG.24

| NAME (TID) | ADDRESS (NSAP) |
|---|---|
| DSNE | xy 2744 |
| C2 | xy 2727 |
| C3 | xy 4155 |
| C4 | xy 6002 | ns
NETWORK ELEMENT INCLUDING AUTOMATIC NETWORK ELEMENT IDENTITY INFORMATION REGISTRATION APPARATUS AND METHOD

CROSS-REFERENCE TO RELATED APPLICATION

United States patent applications Ser. No. 07/989,615, now U.S. Pat. No. 5,303,235 issued Apr. 12, 1994, Ser. No. 07/990,743 (now pending) and Ser. No. 07/990,385, now U.S. Pat. No. 5,335,299 issued Aug. 2, 1994 were filed concurrently herewith.

TECHNICAL FIELD

This invention relates to digital communications systems and, more particularly, to telecommunications management networks.

BACKGROUND OF THE INVENTION

In prior telecommunications management networks, it was necessary to manually input the identities of the communications system elements within the network. The identity information was required at each element in the network. Consequently, when a network element was either added or deleted, each of the elements would have to be manually updated with the identity of the element or elements being added or deleted from the network. Additionally, when adding a network element, all the identity information of the other elements in the network would have to be manually inputted into the new network element. Such manual inputting of the identity information into the network elements is not only time consuming, but prone to errors. Another shortcoming of prior such telecommunications management networks is that physical records of the network element identity information had to be maintained in order to know the configuration of the network elements.

SUMMARY OF THE INVENTION

Problems and limitations of prior telecommunications management networks are overcome in a telecommunications network including a network element provisioned as a so-called Directory Services Network Element (DSNE) and at least one sub-network intended to include one or more network elements, in accordance with the principles of the invention, by employing a routing exchange protocol to dynamically maintain identity information of network elements reachable within the network, enhancing the routing exchange protocol interface to automatically supply an indication of detection of a newly reachable network element to an applications layer. protocol, and using the indentity information of a newly reachable network element in the applications layer protocol of the DSNE to establish communications with the newly reachable network element. Then, the newly reachable network element supplies additional identity information (e.g., its name, network address and the like) to the DSNE. The DSNE, upon receiving the additional identity information, supplies its identity information to the newly reachable network element. Consequently, the identity information of the DSNE is supplied to each newly reachable network element as it is added to the network. This provides all network elements the capability of establishing communications with the DSNE, so that queries can be made for identity information of other network elements in the sub-network. The retrieved identity information can, in turn, be used by the individual network elements to establish communications with other network elements in the sub-network.

BRIEF DESCRIPTION OF THE DRAWINGS

In the drawing:

FIG. 10 is a table illustrating a directory information base (DIB) included in the DSNE of FIG. 9;

FIG. 11 is a table of identity information distributed by the DSNE to network elements A1, A2 and A3 of FIG. 9;

FIG. 12 is a table of identity information distributed by the DSNE to network elements B1, B2, B3 and B4 of FIG. 9;

FIG. 13 is a table of identity information distributed by the DSNE to network elements C1, C2, C3 and C4 of FIG. 9;

FIG. 18 is a table illustrating a directory information base included in the integrated "DSNE" 1401 of FIG. 14;

FIG. 19 is a table of identity information distributed by DSNE 1402 of FIG. 14 to integrated network element A1*;

FIG. 20 is a table of identity information distributed by the integrated "DSNE" 1401 of FIG. 14 to network elements A2 and A3;

FIG. 21 is a table of identity information distributed by DSNE 1402 of FIG. 14 to integrated network element B1*;

FIG. 22 is a table of identity information distributed by the integrated "DSNE" 1401 of FIG. 14 to network elements B2, B3, B4 and B5;

FIG. 23 is a table of identity information distributed by DSNE 1402 of FIG. 14 to integrated network element C1*; and FIG. 24 is a table of identity information distributed by the integrated "DSNE" 1401 of FIG. 14 to network elements C2, C3 and C4.

DETAILED DESCRIPTION

Figure 1:
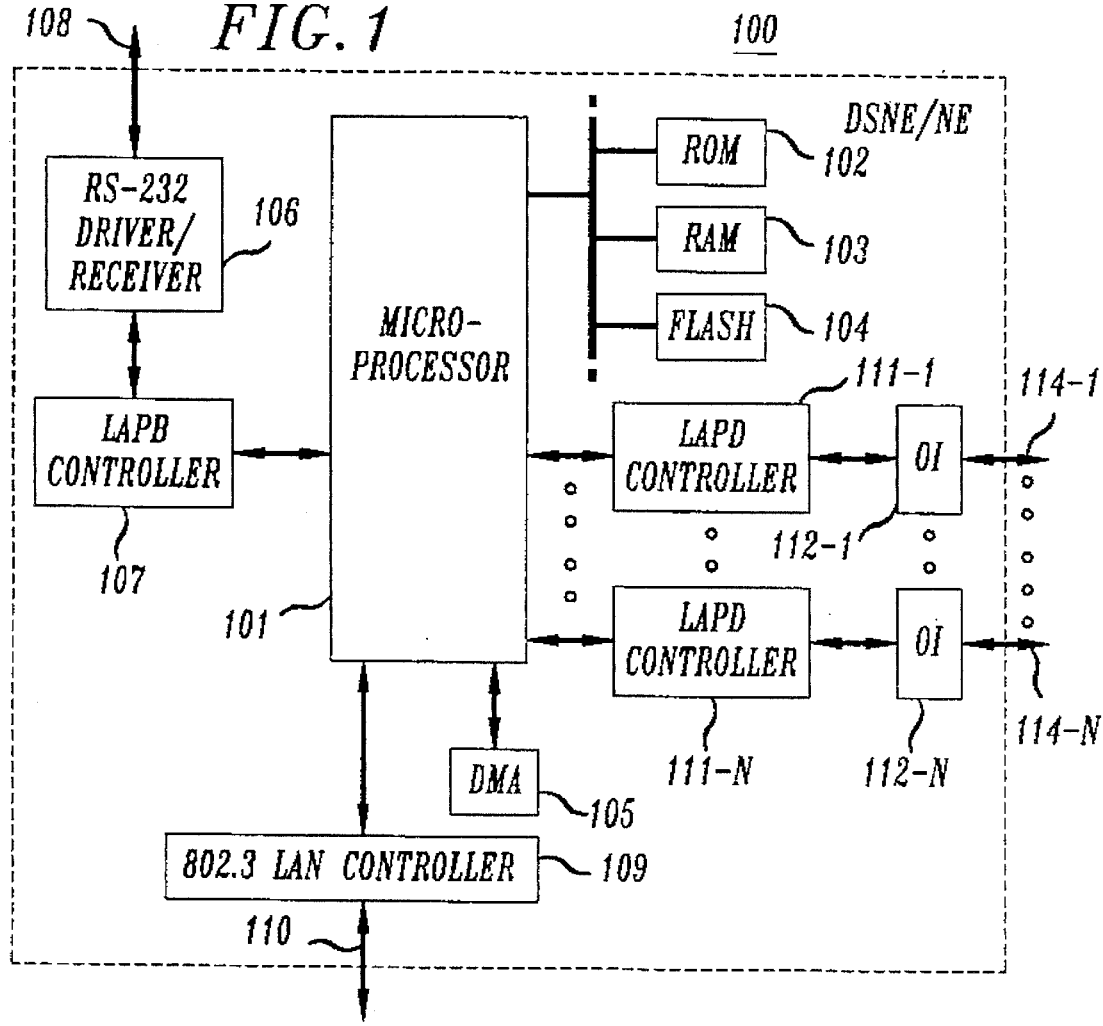
FIG. 1 shows, in simplied block diagram form, details of a network element which may be employed either as a Directory Services Network Element (DSNE) or as a remote Network Element (NE)

FIG. 1 shows in simplied block diagram form, details of a Network Element 100 (DSNE/NE) which may be employed as either a Directory Services Network Element (DSNE) or a remote Network Element (NE) in a telecommunications management network. Hereinafter, Network Element 100 is referred to as DSNE/NE 100. Specifically, shown are microprocessor 101, read only memory (ROM) 102, random access memory (RAM) 103, non-volatile memory (FLASH) 104 and direct memory access unit (DMA) 105 which form a local processor complex within DSNE/NE 100. Such local processor complexes are known and operate in well-known fashion. Microprocessor 101 is interfaced via RS-232 driver/receiver 106 and LAPB controller 107 via circuit path 108 to an external network management system (not shown). Operation of units 106 and 107 are well-known in the art. Microprocessor 101 is also interfaced via IEEE 802.3 LAN controller 109 and circuit path 110 to a so-called intra-office local area network (LAN) (not shown). Additionally, microprocessor 101 is interfaced via LAPD controllers 111-1 through 111-N and corresponding optical interfaces 112-1 through 112-N, respectively, to fiber optic links 114-1 through 114-N. Again, LAPD controllers 111 and optical interfaces 112 are well-known in the art.

Figure 2:
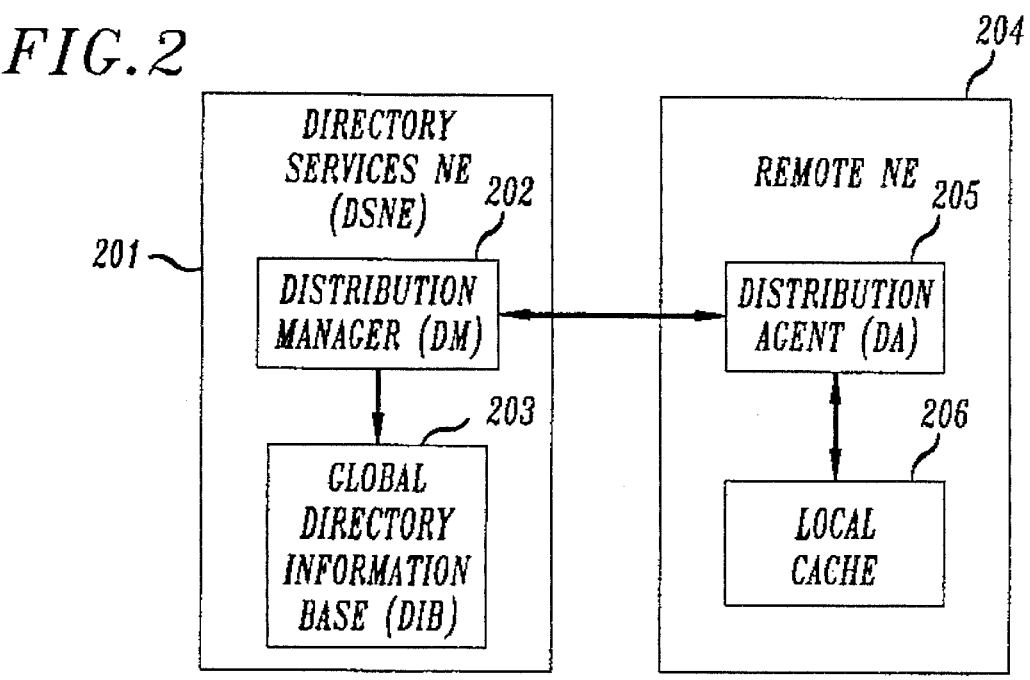
FIG. 2 shows, in simplied block diagram form, a telecommunications network in which the invention may be incorporated.

FIG. 2 shows, in simplied form, the logical operation of DSNE/NE 100 when configured as DSNE 201 and also as remote NE 204 to effect directory services registration, in accordance with the principles of the invention. Specifically, when configured as DSNE 201, DSNE/NE 100 of FIG. 1 is provisioned to provide Distribution Manager (DM) function 202 and includes a global Directory Information Base (DIB) 203. When configured as NE 204, DSNE/NE 100 of FIG. 1 is provisioned to provide Distribution Agent (DA) function 205 and includes local cache 206. As will be apparent to those skilled in the art, DSNE/NE 100 of FIG. 1 typically includes all the routines to effect both the functions of DSNE 201 and the functions of remote NE 204 and depending on how it is configured, the appropriate ones of DM 202, DIB 203, DA 205 and cache 206 will be activated.

Figure 3:
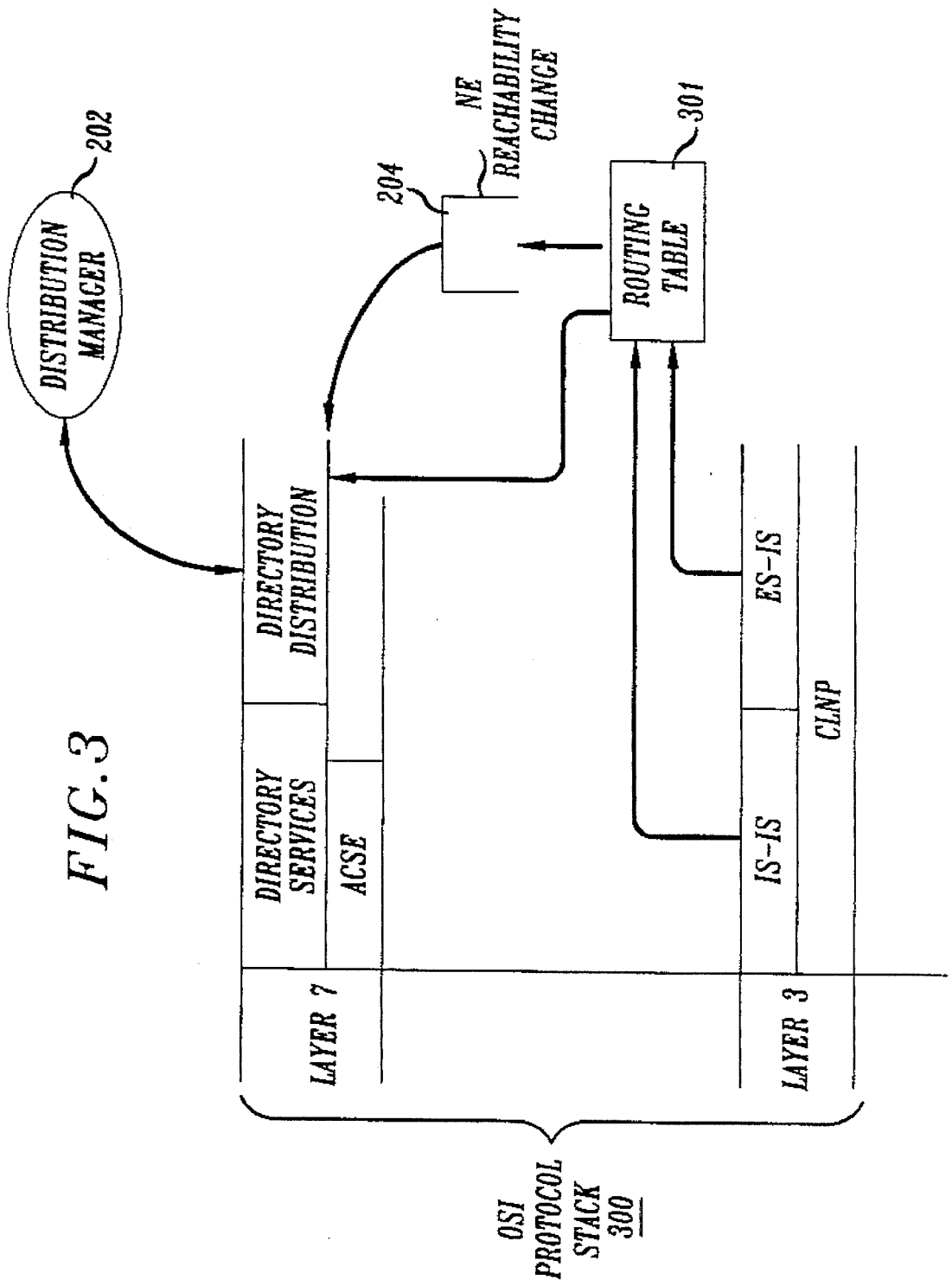
FIG. 3 illustrates the operation of the invention using a particular protocol stack.
Figure 3A:
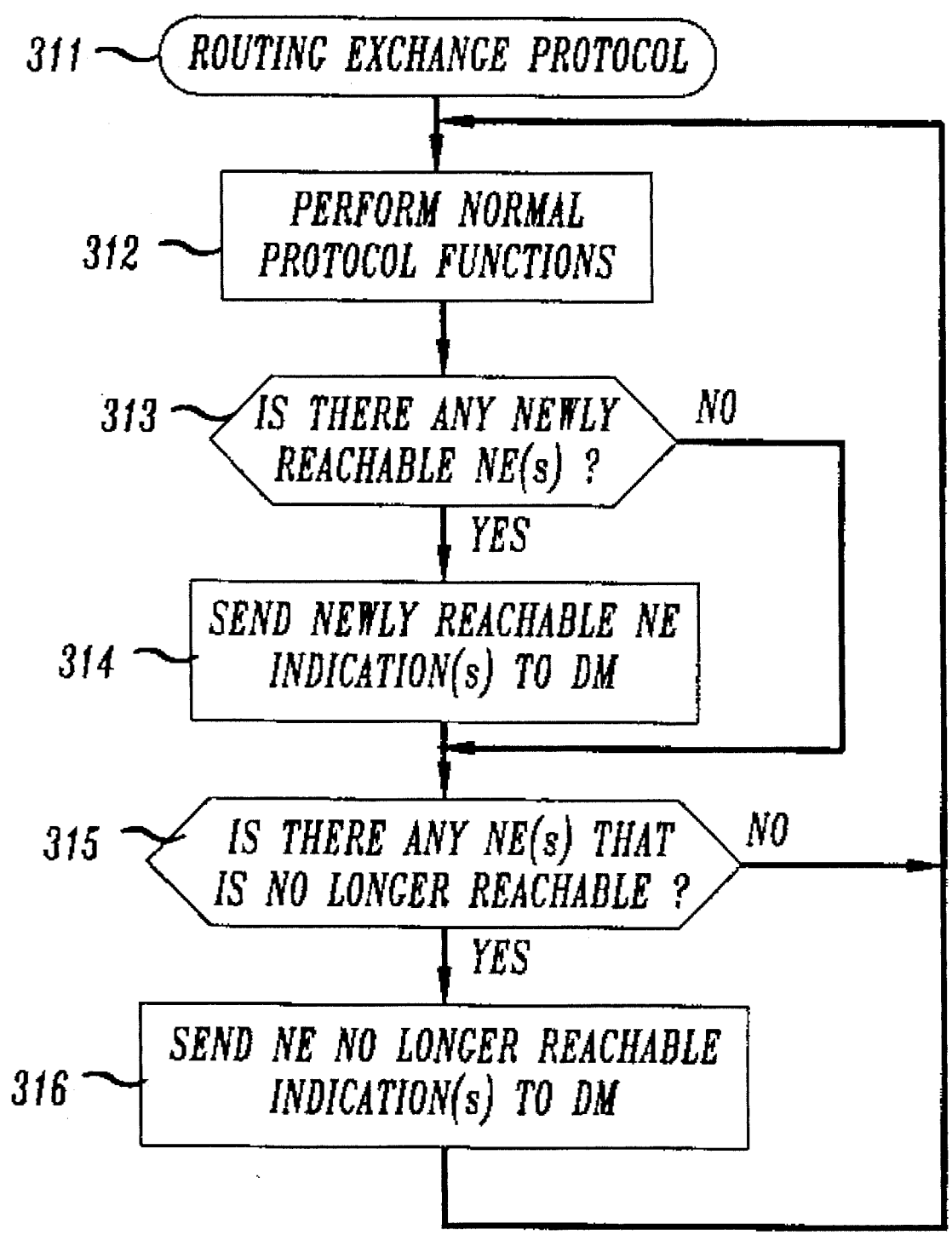
FIG. 3A is a flow chart illustrating the enhancement to the routing exchange protocol interface.

FIG. 3 shows in simplied form, an Open System Interconnection (OSI) protocol stack 300 which includes at least network layer 3 including appropriate routing protocols and applications layer 7. It will be apparent that the OSI protocol stack typically would include other layers for supporting other functionality as desired by the implementor. Such an OSI protocol stack is known in the art and is defined in ISO/ICE 7498:1987. It is noted that in prior such OSI protocol stacks each layer operates independently of the other layers and was specifically designed to allow interaction between adjacent layers only and not between layers separated by other layers. In accordance with the principles of the invention, a so-called newly reachable remote NE element, for example, 204 of FIG. 2, is automatically registered in DSNE 201. This is realized, in accordance with the invention, by employing routing exchange protocols Intermediate System-Intermediate System (IS—IS) and End System-Intermediate System (ES-IS) in network layer 3 of the OSI protocol stack 300 to dynamically maintain identity information of newly reachable network element 204 in routing table 301 and by enhancing the routing exchange protocol interface to automatically supply an indication that either newly reachable network element 204 has been detected or an indication that an existing network element has ceased to be reachable directly to applications layer 7 of ISO protocol stack 300 and, specifically, therein to a directory distribution protocol. The enhancement to the routing exchange protocol and its interface, in accordance with the invention, is shown in FIG. 3A and described below. The directory distribution protocol in layer 7 interfaces with distribution manager 202 (FIG. 2) in such a manner as will be described below. It should be noted, however, that DSNE 201 and NE 204, as well as, any other NEs in a SONET Management Sub-system Branch (SMSB), will be operating the IS—IS and ES-IS routing protocols so that DSNE 201 will be able to automatically detect the presence of newly reachable network element or network elements which cease to be reachable, in accordance with the principles of the invention. Consequently, the indications of newly reachable network elements and indications that existing network elements cease to be reachable are maintained via distribution manager 202 automatically and the need for manually inputting such information, as was done in the past, is eliminated. Protocols IS—IS and ES-IS are well-known in the art and are defined in ISO/IEC 10589:1991 and ISO/IEC 9542:1988, respectively. Network layer 3 also includes a connectionless network protocol (CLNP) which provides a connectionless mode of network service, in well known fashion, as defined in ISO/IEC 8473:1988. Applications layer 7 also includes a subset of the directory services protocol as defined in CCITT Recommendation X.500:1988. The associated control service element (ACSE), in applications layer 7, is employed to establish associations between applications routines residing in different network elements, in known fashion, and is defined in CCITT Recommendations X.217 and X.227. Specifically, by way of an example, there would be an association established via ACSE between the distribution manager (DM) in DSNE 201 and the distribution agent (DA) in remote NE 204.

FIG. 3A is a flow chart illustrating the enchancement made to the routing exchange protocol and its interface in the network layer, in accordance with the invention, to automatically supply an indication that either a newly reachable network element has been detected or an indication that an existing network element has ceased to be reachable directly to applications layer 7 of ISO protocol stack 300 (FIG. 3) and, specifically, therein to a directory distribution protocol. The routine of FIG. 3A would typically be stored in flash 104 of the DSNE/NE 100 (FIG. 1) and is employed when provisioned as a DSNE. Specifically, the routing exchange protocol is entered via step 311. Thereafter, step 312 causes the known normal protocol functions of the routing exchange protocol to be performed. It is noted as a result of such functions being performed, newly reachable network elements are added to routing tables in the routing exchange protocol and network elements that are no longer reachable are removed from the routing tables of the routing exchange protocol in known fashion. Then, step 313 tests to determine if any newly reachable network element(s) has been added to the routing table of the routing exchange protocol. If the test result in step 313 is no, step 314 is by-passed and control is passed to step 315. If the test result in step 313 is yes, control is passed to step 314 which generates an indication(s) that a newly reachable network element(s) has been detected which indication is automatically supplied directly to applications layer 7 and, therein, to the directory distribution protocol, in accordance with the invention. In this manner, the routing exchange protocol interface is enchanced, in accordance with the invention. Thereafter, step 315 tests to determine if any network element(s) which is no longer reachable has been removed from the routing tables of the routing exchange protocol. If the test result in step 315 is no, step 316 is by-passed and control is returned to step 312. If the test result in step 315 is yes, control is passed to step 316 which generates an indication(s) that an existing network element(s) has ceased to be reachable and automatically supplies the indication(s) directly to the applications layer 7 and, therein, to a directory distribution protocol, in accordance with the invention. Again, in this manner the routing exchange protocol interface is enhanced, in accordance with the invention. Thereafter, control is returned to step 312. Again, it is noted that the loop comprising steps 312 through 316 effects the enchancement to the routing exchange protocol and its interface, in accordance with the invention.

Figure 4:
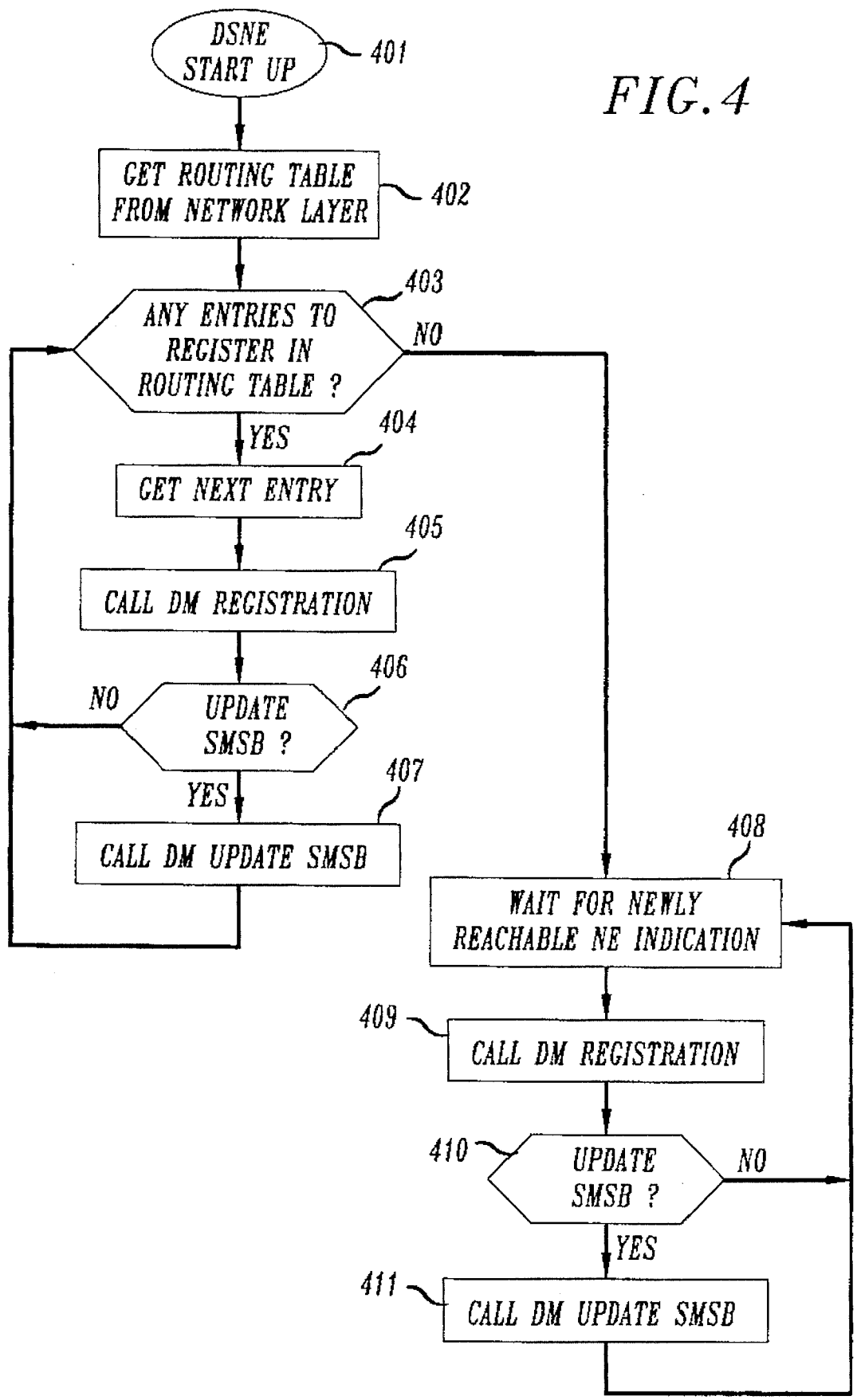
FIG. 4 is a flow chart illustrating the operation of an aspect of the invention in a Directory Services Network Element (DSNE)
Figure 5:
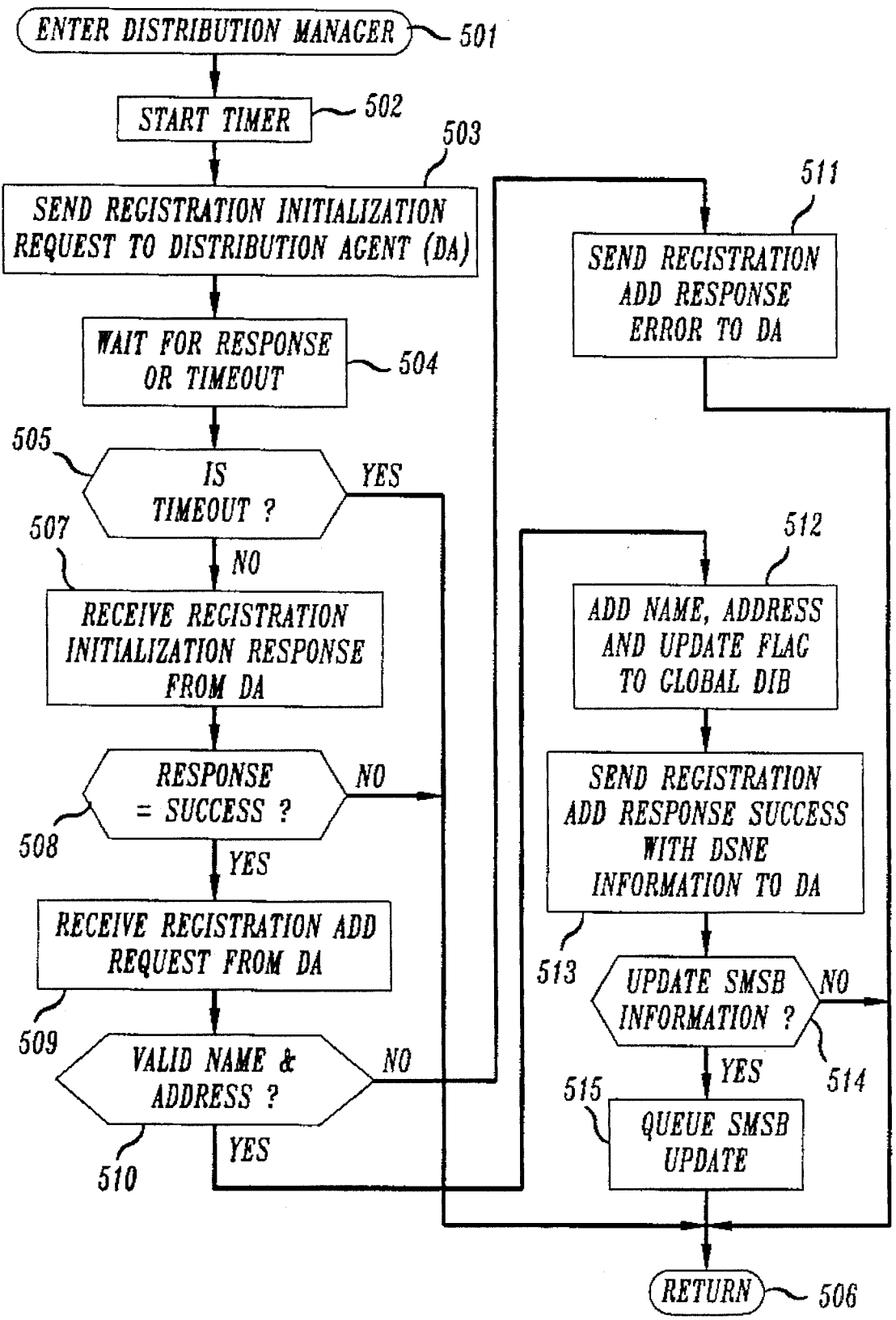
FIG. 5 is a flow chart illustrating the operation of a distribution manager routine employed in the routine of FIG. 4.

FIG. 4 is a flow chart illustrating the operation of DSNE 201 in automatically registering identity information of remote network elements, in accordance with the invention. The routine of FIG. 4 would typically be stored in flash 104 of the DSNE/NE 100 (FIG. 1) and is employed when provisioned as a DSNE. Specifically, step 401 indicates the DSNE 201 startup. Thereafter, step 402 causes a routing table to be directly obtained from network layer 3, specifically routing table 301 of FIG. 3. Then, step 403 tests to determine if there are any entries to register in routing table 301. It is noted that upon startup, the DSNE 201 is going to attempt to register all entries populated in routing table 301. The entries in routing table 301 are identity information, i.e., network addresses, of remote network elements forming one or more sub-networks with DSNE 201. If there are entries in routing table 301, step 404 will obtain the next entry. Upon obtaining an entry, step 405 will call a distribution manager (DM) routine which performs the automatic registration of the network address in accordance with the invention. The distribution manager routine is shown in FIG. 5 and described below. Upon performing the automatic registration in step 405, control is passed to step 406 which tests to determine whether a so-called SONET Management Subnetwork Branch (SMSB) should be updated. If the test result in step 406 is yes, then, step 407 calls a DM update SMSB routine to effect the updating of the SMSB automatically, in accordance with the principles of the invention. Thereafter, control is returned to step 403, and steps 403 through 406 (or 407) are iterated until all network addresses of remote network elements in routing table 301 (FIG. 3) have been registered. Once there are no longer any entries in routing table 301 to be registered, control is passed to step 408 where the routine waits until a "newly reachable NE" indication is received from the enhanced routing exchange protocol interface, in accordance with the principles of the invention. Upon receiving the newly reachable NE indication, control is passed to step 409 and the DM registration routine of FIG. 5 is called. Again, the DM registration routine effects, in accordance with the principles of the invention, the automatic registration of the network address of the newly reachable remote NE. Thereafter, control is passed to step 410 which tests to determine whether an SMSB should be updated. If the test result in step 410 is no, control is returned to step 408. If the test result in step 410 is yes, then, step 411 calls a DM update SMSB routine to effect the updating of the SMSB automatically, in accordance with the principles of the invention. Thereafter, control is returned to step 408. Details of the DM update SMSB are shown in FIG. 7 and described below.

Figure 6:
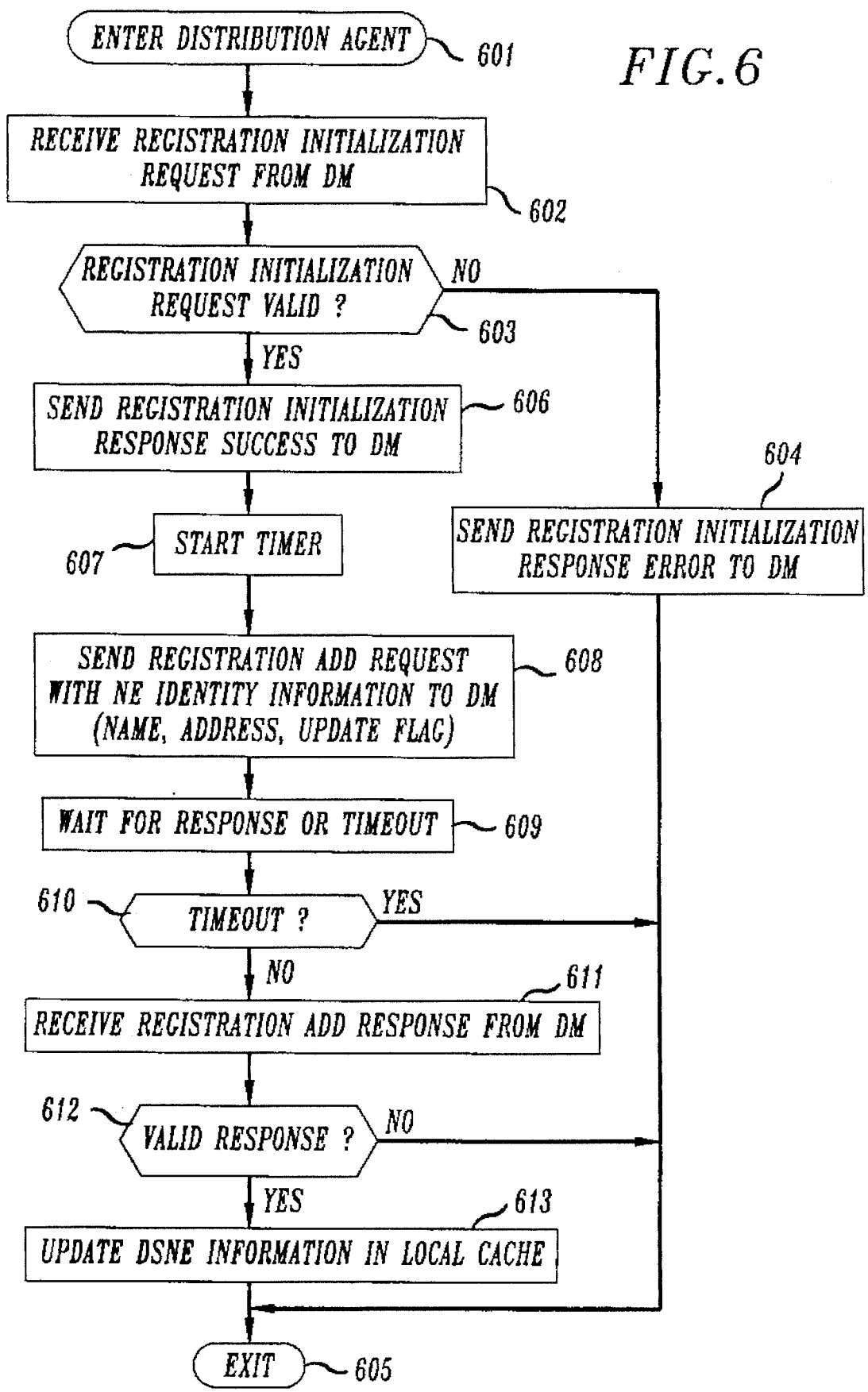
FIG. 6 is a flow chart illustrating the operation of a distribution agent routine employed to interwork with the distribution manager routine of FIG. 5.

FIG. 5 is a flow chart illustrating the operation of the distribution manager (DM) registration routine employed in FIG. 4. Again, this routine is also stored in flash 104 (FIG. 1). Specifically, the DM registration routine is entered via step 501. Thereafter, step 502 starts a timer. The interval of the timer is such as to allow for the automatic registration of a remote network element, e.g., NE 204 (FIG. 2) and is left to the implementor. Step 503 causes DSNE 201 (FIG. 2) to send a registration initialization request to the remote NE 204 and, therein, to a so-called distribution agent (DA) routine which is shown in FIG. 6 and described below. Step 504 causes DSNE 201 to wait for either a response from the DA in the remote NE 204 or the time out of the timer in step 502. Step 505 tests to determine if the timer has timed out. If the result is yes, the timer has timed out and control is returned to the routine in FIG. 4. If the test result in step 505 is no, step 507 causes DSNE 201 to receive a valid response, i.e., receive registration initialization response from the DA in the remote NE 204. Step 508 tests whether the DA in the remote NE 204 successfully provided a valid response. If the test result is no, control is returned via step 506 to the routine of FIG. 4. If the test result in step 508 is yes, a valid response has been received and step 509 causes the DSNE 201 to receive a registration add request from the DA in the remote NE 204. Thereafter, step 510 tests to determine whether the name and address, i.e., the identity information of the remote NE 204 is valid. If the test result is no, step 511 sends a registration add response error indication to the DA in the remote NE 204 and control is returned via step 506 to the routine shown in FIG. 4. If the test result in step 510 is yes, the identity information of the remote NE 204 is valid and step 512 causes that identity information and an update flag to be added to global DIB 203. Thereafter, step 513 automatically causes a registration add response success indication along with identity information of DSNE 201, in accordance with the principles of the invention, to the DA in the remote NE 204. Then, step 514 tests to determine whether the update flag supplied in step 512 indicates that the SMSB information should be updated. That is, whether or not the newly registered remote NE 204 should receive, in accordance with the principles of the invention, identity information of any other network elements in the SMSB including NE 204. If the test result in step 514 is no, control is returned via step 506 to the routine of FIG. 4. If the test result in step 514 is yes, step 515 causes an update SMSB indication to be supplied to the routine of FIG. 4 which, in turn, as indicated above, causes the identity information of the remote NE 204 to be automatically distributed to any other elements in the SMSB including NE 204, in accordance with the invention.

FIG. 6 is a flow chart of the distribution agent (DA) routine employed in the remote network elements to automatically provide identity information to the DSNE. The routine is also typically stored in flash 104 of each of the network elements (FIG. 1). Specifically, the DA routine is entered via step 601. Thereafter, step 602 causes the remote NE 204 (FIG. 2) to receive a registration initialization request from the DM routine of FIG. 5 employed in DSNE 201 (FIG. 2). Then, step 603 tests to determine whether the registration initialization request is valid. If the test result is no, step 604 causes a registration initialization response error to be sent to the DM routine of FIG. 5 in DSNE 201. Thereafter, the routine is exited via step 605. If the test result in step 603 is yes, a valid registration initialization request has been received and step 606 causes a registration initialization response success indication to be sent to the DM routine of FIG. 5 in DSNE 201. Step 607 causes a timer to be started. The interval of the timer is such as to allow the identity information of the remote NE 204 to be sent to the DM routine in DSNE 201 and obtain a response indicating reception from the DM routine of FIG. 5 in DSNE 201. Then, step 608 causes a registration add request with the NE 204 identity information to be automatically sent to the DM routine in DSNE 201, in accordance with the principles of the invention. Step 609 causes the DA to wait for a response from the DM or time-out of the timer. Step 610 tests to determine if the timer interval has elapsed. If the test result in 610 is yes, no response has been obtained from the DM and the routine is exited via step 605. If the test result in step 610 is no, a response has been obtained from the DM and step 611 causes reception of the registration add response from the DM routine in DSNE 201. Then, step 612 tests to determine whether the received registration add response is valid. If the test result is no, the routine is exited via step 605. If the test result in step 612 is yes, the registration add response is valid and step 613 causes the identity information of DSNE 201 to be stored in local cache 206 (FIG. 2) of NE 204, in accordance with the principles of the invention.

Figure 7:
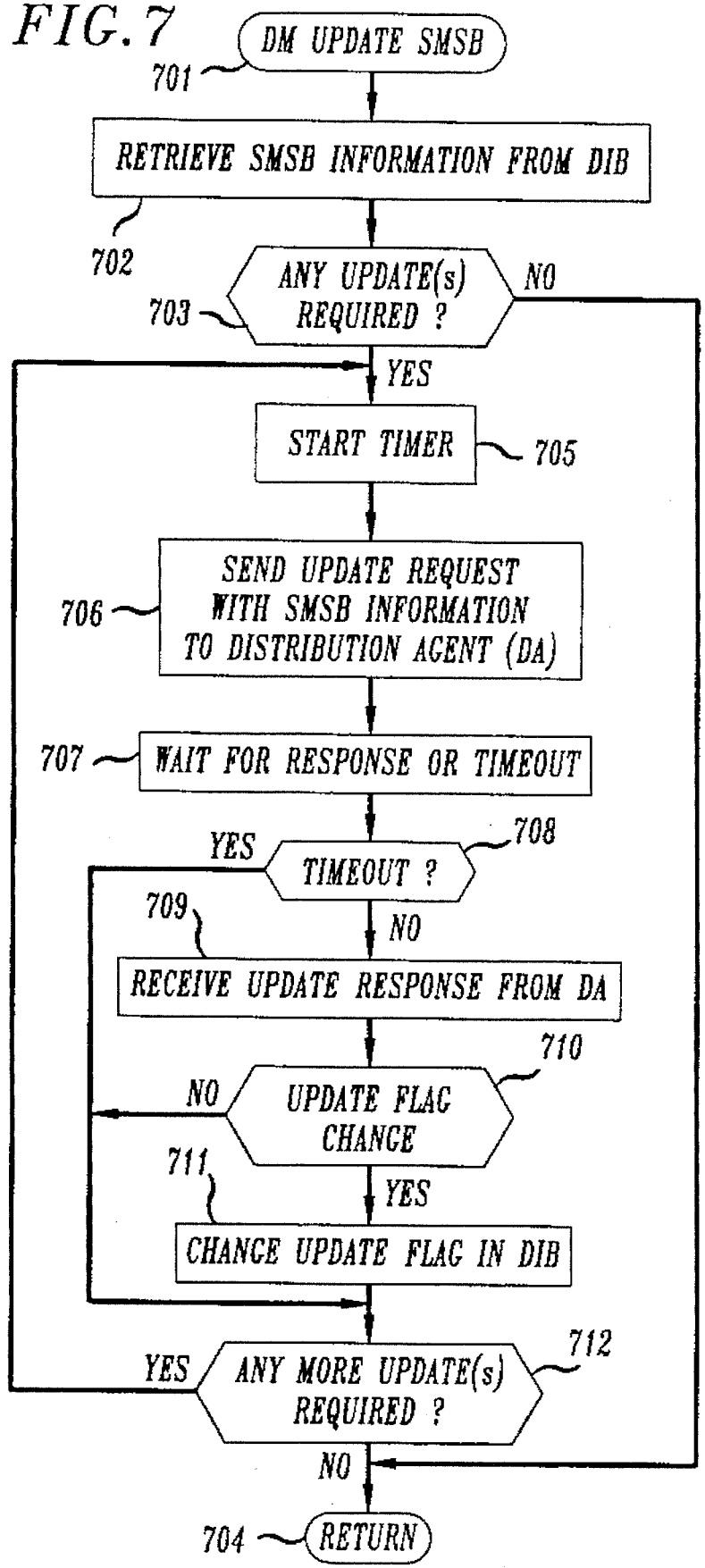
FIG. 7 is a flow chart illustrating the operation of the DSNE in updating all the network elements with new identity information.

FIG. 7 is a flow chart showing the steps of the DM update SMSB routine of FIG. 4. Specifically, the DM update SMSB routine is entered via step 701. The routine is typically stored in flash 104 of the DSNE/NE 100 (FIG. 1) and is employed when provisioned as a DSNE. Then, step 702 causes the SMSB identity information to be retrieved from global directory information base (DIB) 203 in DSNE 201 (FIG. 2). Step 703 tests to determine if any of the SMSB network elements require to be updated. If the test result is no, control is returned via step 704 to the routine of FIG. 4. If the test result in step 703 is yes, a timer is started. The interval of the timer is such as to allow the identity information for the SMSB to be distributed to a network element in the SMSB. Then, step 706 causes an update request with the SMSB information to be sent to the DA in a network element, e.g. NE 204. Step 707 causes DSNE 201 to wait for a response or time out of the timer in step 705. Step 708 tests to determine if the timer has elapsed. If the test result is yes, control is passed to step 712. If the test result in step 708 is no, step 709 causes DSNE 201 to receive an update response from the DA of the remote NE 204. Then, step 710 tests to determine whether an update flag supplied from the DA in remote NE 204 is changed. If the test result is no, control is passed to step 712. This indicates that the particular remote NE will continue to receive further updates concerning SMSB identity information. If the test result in step 710 is yes, step 711 causes the update flag for this particular remote NE to be changed in global DIB 203 (FIG. 2). This indicates that the particular remote NE will no longer receive updates concerning SMSB identity information. Thereafter, step 712 tests to determine if any more of the SMSB network elements require to be updated. If the test result in step 712 is no, control is returned via step 704 to the routine of FIG. 4. If the test result in step 712 is yes, then, control is returned to step 705 and steps 705 through 712 are iterated until all necessary network element updates are performed. It is noted that while the invention is described herein in terms of the updates performed following the addition of new network elements to the network, the principles of the invention are equally applicable to applications that require updating of SMSB information; such an application would include, but not be limited to, the updates required following a modification of identity information (e.g., a change in TID) of a network element in a sub-network.

Figure 8:
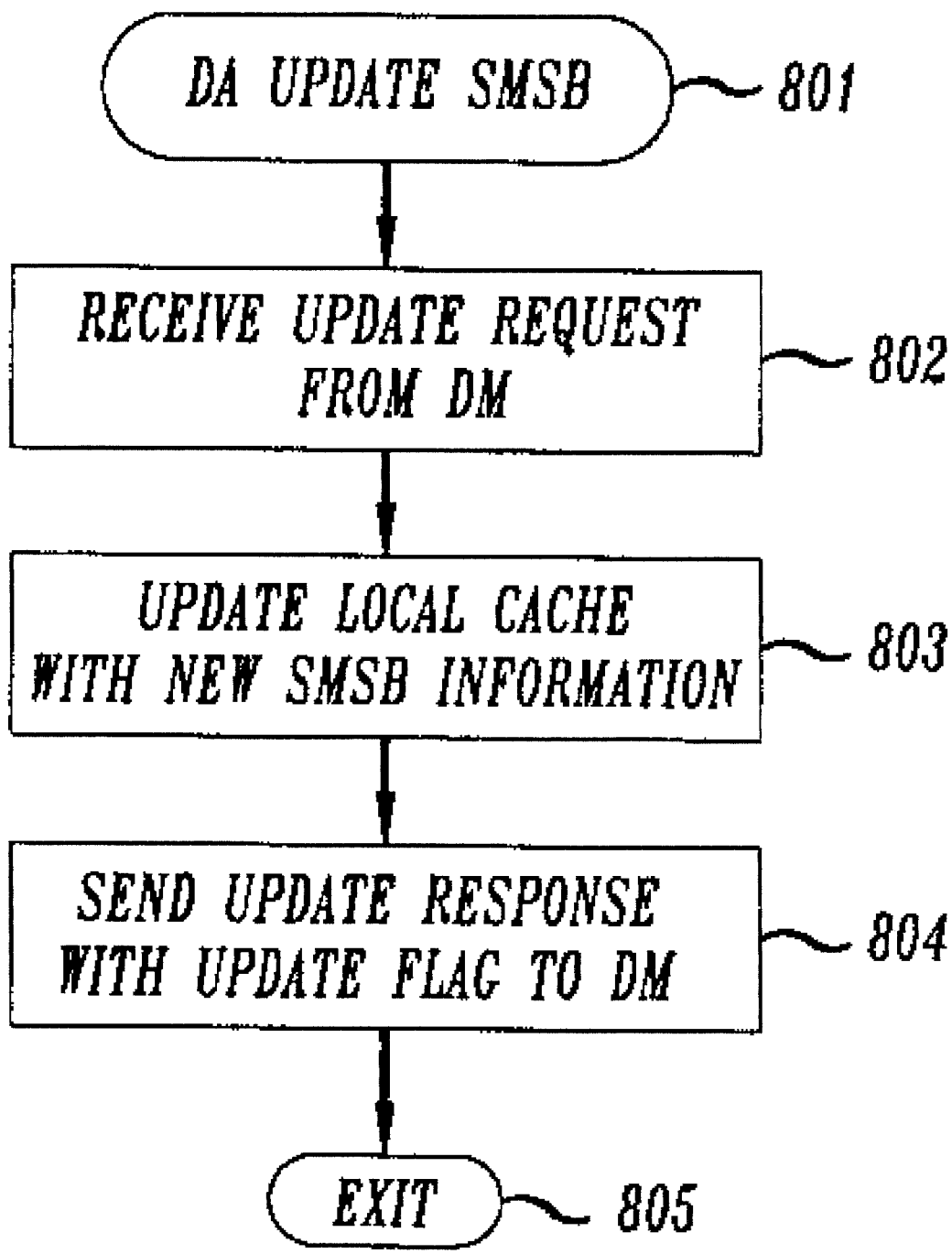
FIG. 8 is a flow chart illustrating the operation of network elements other than the DSNE upon receiving the updated identity information.

FIG. 8 is a flow chart illustrating the operation of the update SMSB distribution agent routine employed in the remote network elements, e.g., NE 204 (FIG. 2), to automatically update the local cache in the network element. The routine is typically stored in flash 104 of each of the network elements. Specifically, the DA update SMSB routine is entered in step 801. Thereafter, step 802 causes the network element to receive an update request from the DM in DSNE 201. Then, step 803 causes the local cache in NE 204 to be updated with the new SMSB identity information. Step 804 causes an update response with an update flag to be sent to the DM in DSNE 201. Thereafter, the DA update SMSB routine is exited via step 805.

Figure 9:
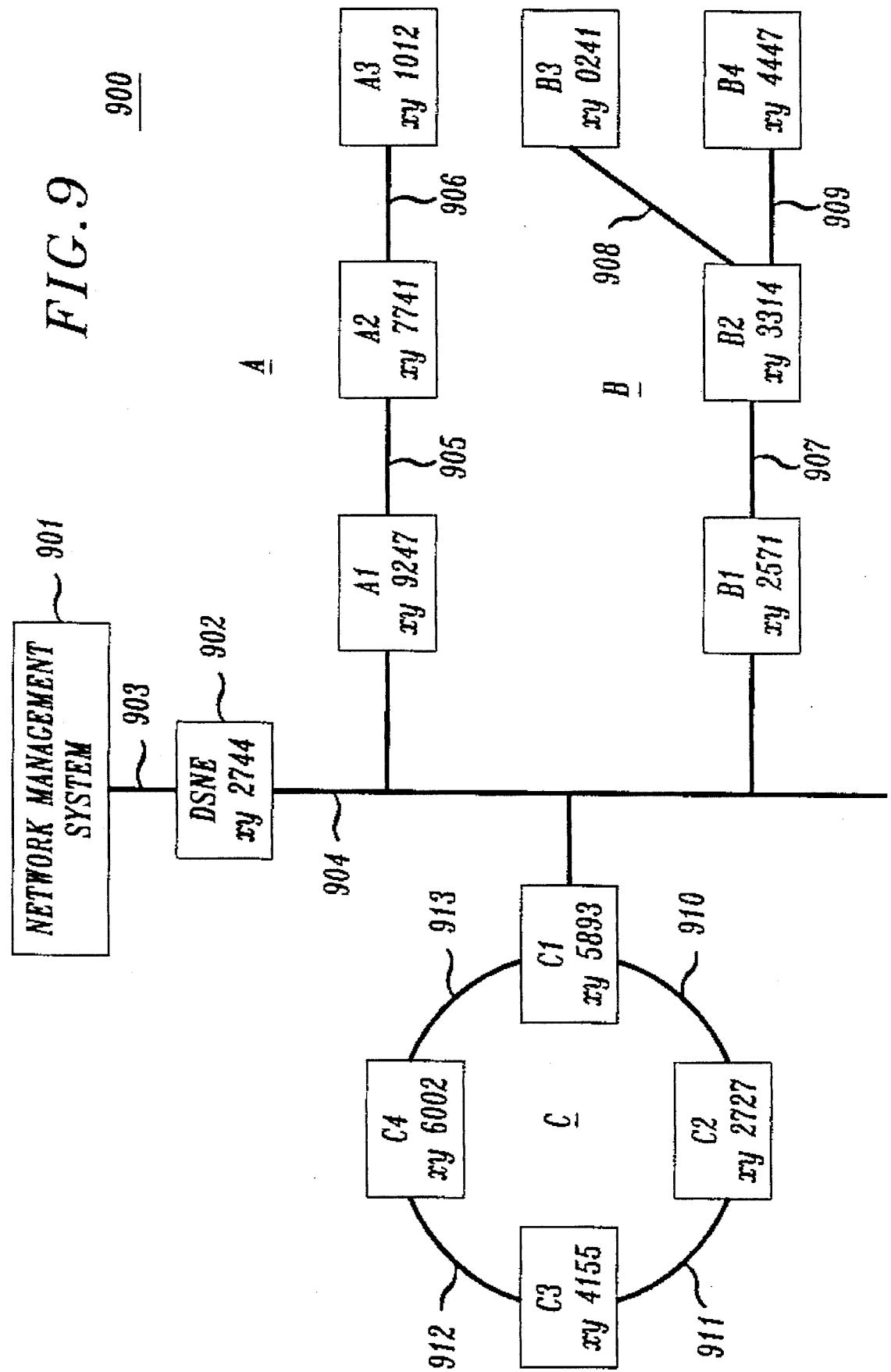
FIG. 9 shows, in simplied block diagram form, a telecommunications network in which the invention may be practiced.

FIG. 9 shows, in simplied block diagram form, a sample network 900 incorporating the inventions. Specifically, shown is network management system 901 which may be, for example, a known operations and support system employed to manage a telecommunications network. Network management system 901 is interfaced to DSNE 902 which may be, for example, a Digital Access and Cross Connect System (DACS), a digital multiplexer or the like. One such Digital Access and Cross Connect System which may be employed in practicing the invention is the DACS IV-2000, commercially available from AT&T, and one such digital multiplexer which may be employed in practicing the invention is the DDM-2000, also commercially available from AT&T. DSNE 902 and network management system 901 communicate via link 903 using, for example, the known X.25 packet protocol. Referring to FIG. 1, the interface in DSNE 902 to communications link 903 is RS-232 Driver/Receiver 106 and LAPB controller 107. DSNE 902 communicates via local area network (LAN) 904 with a number of sub-networks. In this example, DSNE 902 interfaces via LAN 904 with sub-network A, including network elements A1, A2 and A3, sub-network B, including network elements B1, B2, B3 and B4 and sub-network C, including network elements C1, C2, C3 and C4. Again, referring to FIG. 1 the interface in DSNE 902 to LAN 904 is, in this example, IEEE 802.3 LAN controller 109, which is well known in the art. Similarly, in sub-networks A, B, and C, network elements A1, B1 and C1 each interface to LAN 904 via IEEE 802.3 LAN controller 109 (FIG. 1). In sub-network A, network elements A1, A2 and A3 communicate with each other via optical links. Specifically, network element A1 communications with network element A2 via optical link 905 and network element A2 communicates with network element A3 via optical link 906. As also shown in FIG. 1, in this example, LAPD controller 111 and optical interface 112 are employed to interface with a corresponding optical link in sub-network A. Similarly, in sub-network B, network elements B1, B2, B3 and B4 interface with each other via optical links. Specifically, network element B1 communicates with network element B2 via optical link 907, network elements B2 and B3 communicate via optical link 908 and network elements B2 and B4 communicate via optical link 909. In this example, a LAPD controller 111 and an optical interface 112 are employed to interface with each of the corresponding optical links in sub-network B. Finally, in sub-network C, network elements C1, C2, C3 and C4 interface with each other via optical links. Specifically, network elements C1 and C2 communicate via optical link 910, network elements C2 and C3 communicate via optical link 911, network elements C3 and C4 communicate via optical link 912 and network elements C4 and C1 communicate via optical link 913. In this example, a LAPD controller 111 and an optical interface 112 are employed to interface with a corresponding optical link. It is noted that each of the network elements, including DSNE 902, has its own unique network address and unique name specific to the telecommunications management network. It should also be noted that communications among network elements (DSNE and/or NEs) is via a data communications channel (DCC).

FIG. 10 is a table of directory information base (DIB) included in DSNE 902 of FIG. 9. Shown are the network names, i.e., target identifiers (TIDs), network addresses, i.e., network service access points (NSAPs) of the network elements and which SMSB the particular network element is included in. NSAPs are defined in ISO/IEC 8348:1987 addendum 2:1988. However, for simplicity and clarity of exposition NSAPs having fewer numbers are described here. Thus, for example, DSNE 902 having NSAP "xy 2744" is included in all the SMSB's. Network elements A1 through A3 having NSAPs "xy 9247", "xy 7741" and "xy 1012", respectively, are included in SMSB "A", network elements B1 through B4 having NSAPs "xy 2571", "xy 3314", "xy 0241" and "xy 4447", respectively, are included in SMSB "B" and network elements C1 through C4 having NSAPs "xy 5893", "xy 2727", "xy 4155" and "xy 6002", respectively, are included in SMSB "C".

FIG. 11 shows a table of identity information distributed by DSNE 902 of FIG. 9, in accordance with the principles of the invention, to network elements A1, A2 and A3 of sub-network A. It is noted that the network names and network addresses of the other network elements in the sub-network A and the DSNE are supplied to each network element. Again, the DSNE and NEs A1, A2 and A3 form SMSB "A".

FIG. 12 is a table of identity information distributed by the DSNE 902 of FIG. 9, in accordance with the principles of the invention, to network elements B1, B2, B3 and B4 of sub-network B. It is noted that the network names and network addresses of the other network elements in the sub-network B and the DSNE are supplied to each of the network elements. Again, the DSNE and NEs B1, B2, B3 and B4 form SMSB "B".

FIG. 13 is a table of identity information distributed by the DSNE 902 of FIG. 9, in accordance with the principles of the invention, to network elements C1, C2, C3 and C4 of sub-network C. It is again noted that the network names and network addresses of the other network elements in the sub-network C and the DSNE are supplied to each of the network elements. Again, the DSNE and NEs C1, C2, C3 and C4 form SMSB "C"

Figure 14:
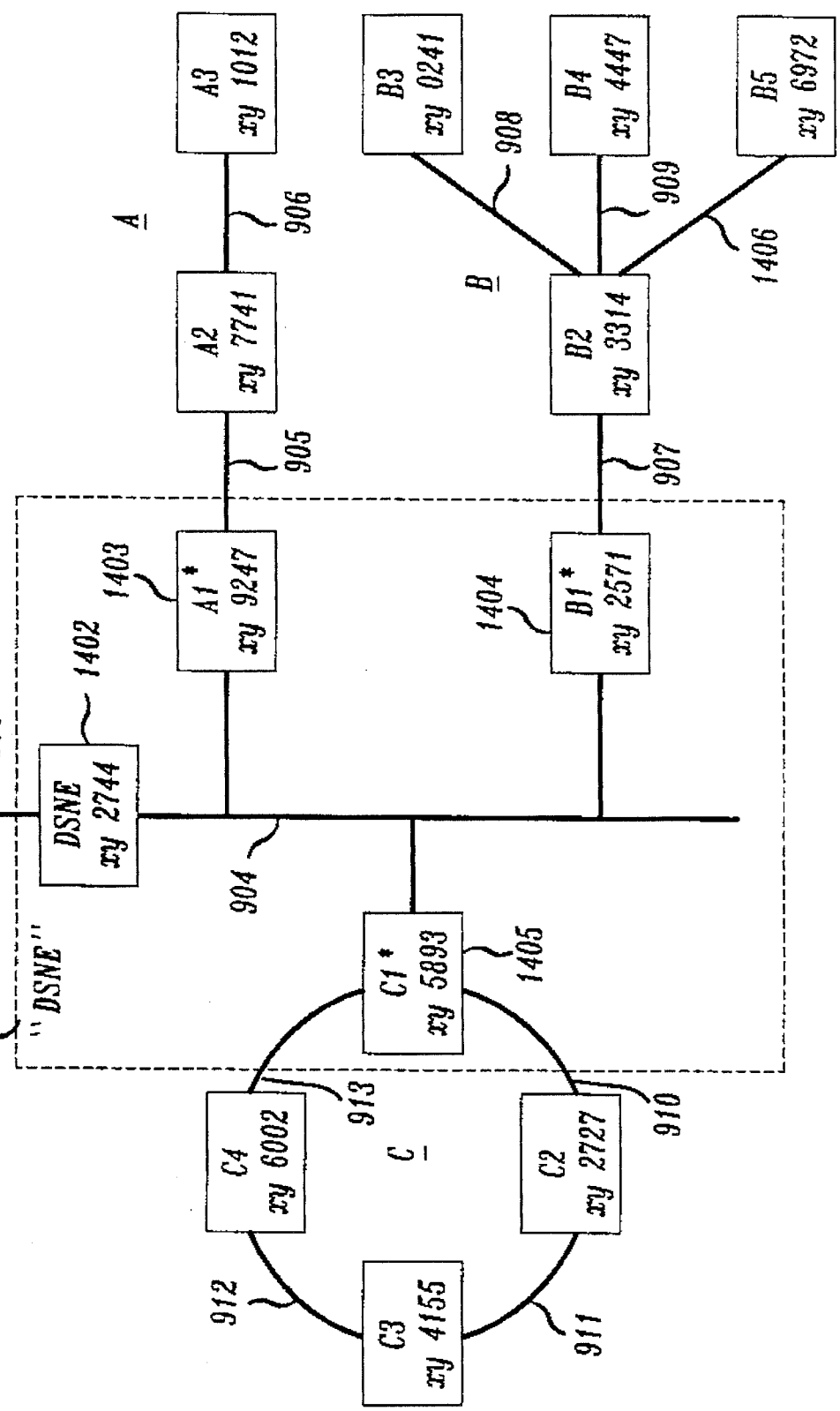
FIG. 14 shows, in simplied block diagram form, a telecommunications network in which a plurality of network elements are integrated into one network element illustrating an aspect of the invention.

FIG. 14 shows, in simplied block diagram form, a telecommunications management system 1400 in which network elements, or portions thereof, are integrated with DSNE 1402 to form a single new "DSNE" 1401. The telecommunications network of FIG. 14, from an apparatus point of view, is similar to that of FIG. 9, except that network elements A1*, B1* and C1*, or portions thereof as will be explained below, are essentially integrated with DSNE 1402 to form a so-called new "DSNE" 1401, which appears to the sub-networks as a single network element from an OAM&P perspective. Again, this is realized, in accordance with the invention, by provisioning the network element being integrated, or a portion thereof, so that it can only provide its identity information to DSNE 1402 and can only receive identity information of DSNE 1402. DSNE 1402 will not provide the identity information of any of the integrated network elements to any of the other network elements in the sub-network which is interfaced to it. DSNE 1402 performs both end systems functions, as well as, intermediate systems functions. That is to say, DSNE 1402 is capable of terminating applications messages, as well as, routing and relaying messages to SMSBs A, B and C, in this example. Those network elements of network 1400 which are essentially identical to those shown in network 900 of FIG. 9 are similarly numbered and will not be described in detail again.

Thus, in telecommunications network 1400, new "DSNE" 1401 appears, in accordance with the invention, to be a single integrated DSNE to each of sub-networks A, B and C. In this example, however, sub-network A now includes only network elements A2 and A3, sub-network B now includes network elements B2 through B5 and sub-network C now includes only network elements C2 through C4. Network elements A1* (1403), B1* (1404) and C1* (1405) are integrated into new "DSNE" 1401 and appear as "routers" or so-called "intermediate systems" (ISs) to the other network elements in SMSBs A, B and C, respectively. In this manner, new "DSNE" 1401 can provide optical interfaces to each of sub-networks A, B and C of FIG. 14 without the need of expending significant development time and cost.

Figure 15:
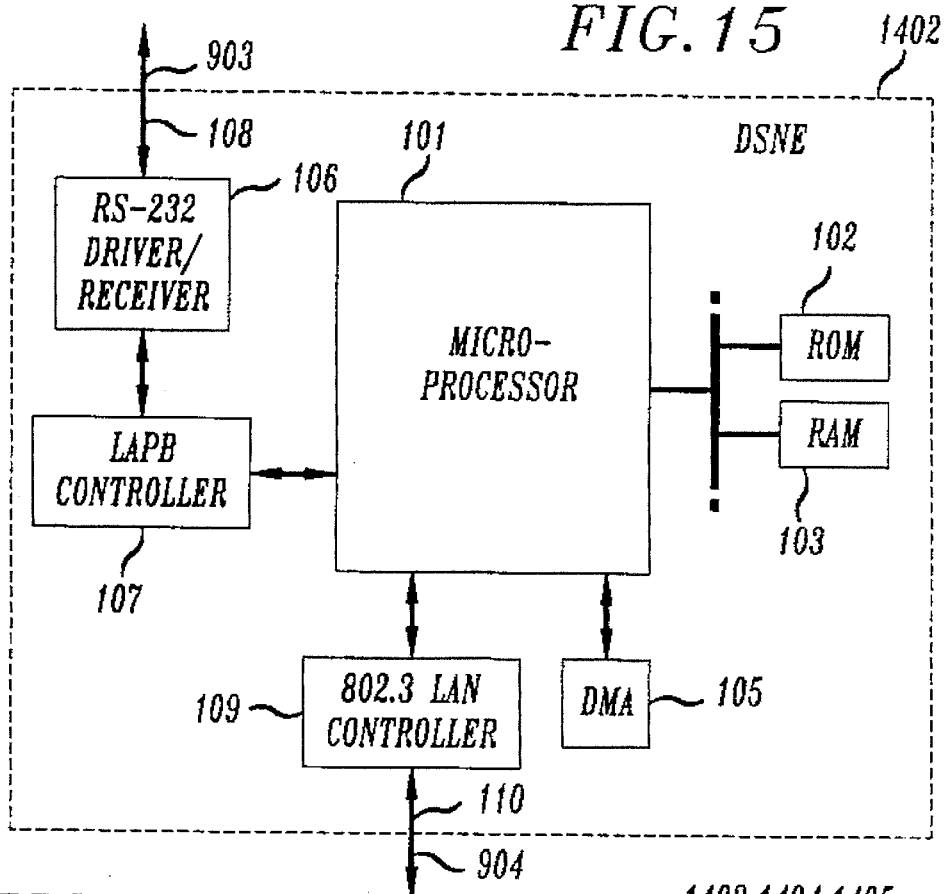
FIG. 15 shows, in simplied block diagram form, details of DSNE 1402 employed in "DSNE" 1401 of FIG. 14.

Referring to FIG. 15, shown in simplified form, are details of DSNE 1402 of FIG. 4. Note that, the only difference between DSNE 1402 of FIG. 15 and DSNE/NE 100 of FIG. 1 are that unnecessary elements have been eliminated. In DSNE 1402 flash memory 104 LAPD controller 111 and optical interfaces 112 have been eliminated. Otherwise, the remaining elements in DSNE 1402 are identical to those in DSNE/NE 100 of FIG. 1 and have been similarly numbered and will not be described again.

Figure 16:
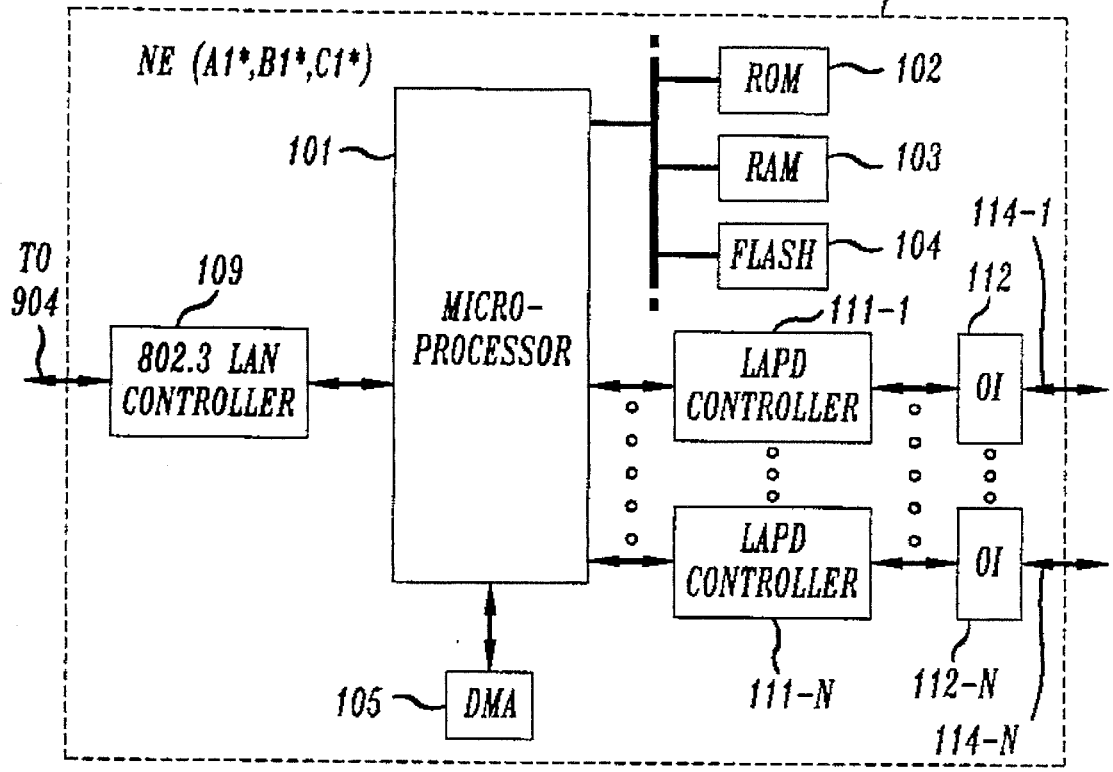
FIG. 16 shows, in simplied block diagram form, details of network elements A1*, B1* and C1* integrated into "DSNE" 1401 of FIG. 14.

Referring to FIG. 16, shown in simplified form, are details of the network elements A1*, B1* and C1* of FIG. 14. Note that the only differences between the network element of FIG. 16 and the network element of FIG. 1 are that the RS-232 driver/receiver 106 and LAPB controller 107 of FIG. 1 have been eliminated. Otherwise, the remaining elements in the network element of FIG. 16 have been similarly numbered to those in FIG. 1 and will not be described again.

Figure 17:
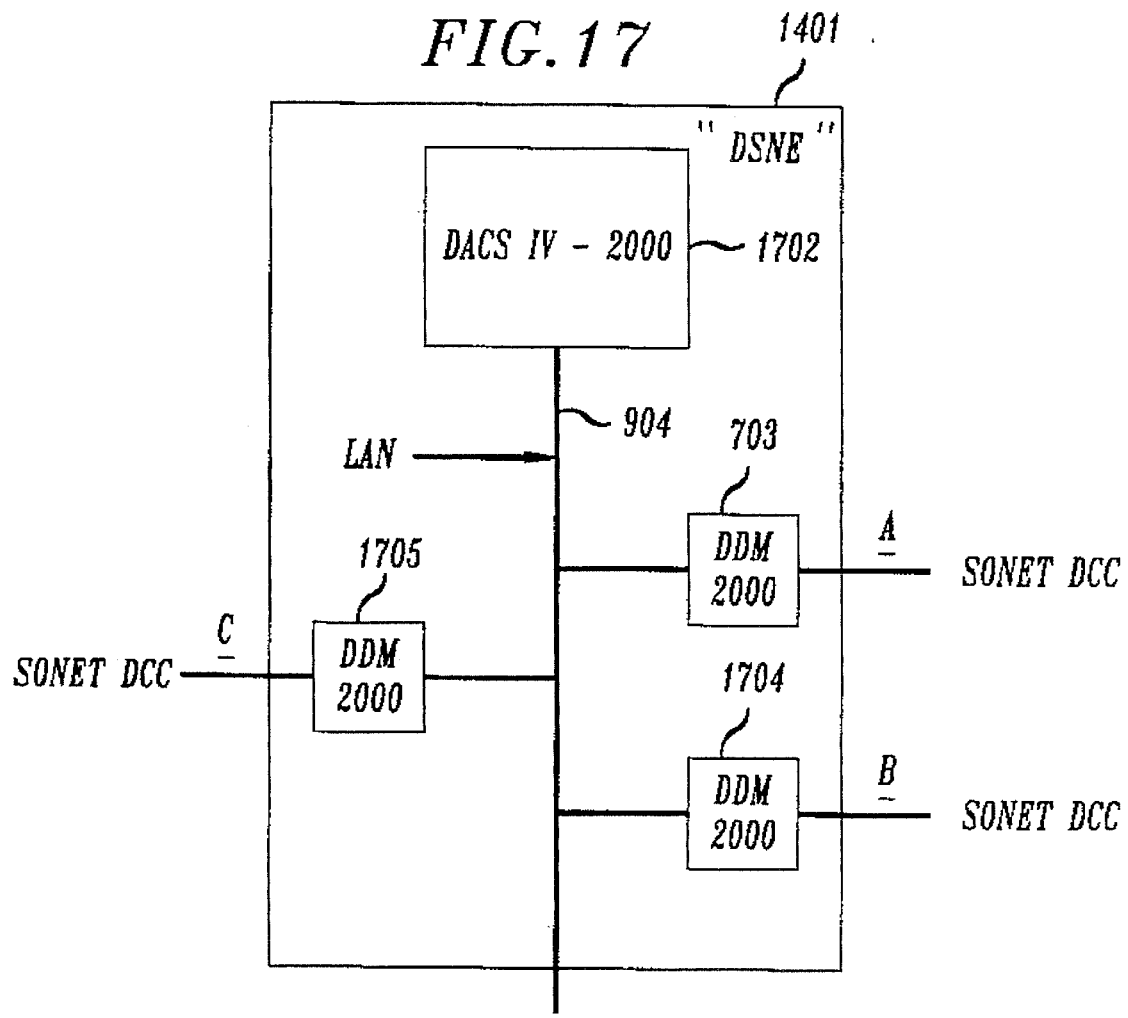
FIG. 17 shows, in simplied block diagram form, one configuration, including integrated network elements into the single integrated network element of FIG. 14.

FIG. 17 shows, in simplified form, an implementation of "DSNE" 1401 employing commercially available equipment units. Specifically, shown is a DACS IV-2000 (1702), which is commercially available from AT&T, which would interface with the external network management system (not shown) and interface via a LAN 904 to DDM-2000 digital multiplexer units, or portions thereof (see FIG. 16), namely, 1703, 1704 and 1705 to provide optical interfaces to a plurality of SMSBs A, B and C, respectively. To this end, the SONET data communications channel from each of the DDM-2000's integrated into the DSNE would be utilized to communicate with remote network elements in each of the sub-networks. Specifically, the SONET data communications channel bytes D1–D3 and/or D4–D12 of the SONET overhead channel.

FIG. 18 is a table of directory information base (DIB) included in DSNE 1402 of FIG. 14. Shown are the network names (TIDs), network addresses (NSAPs) of the network elements and which SMSB the particular network element is included in. Thus, for example, DSNE 1402 is included in all the SMSBs. Network element A1* is included in subnetwork A*. Network elements A2 and A3 are included in sub-network A. Network element B1* is included in sub-network B*. Network elements B2 through B5 are included in sub-network B. Network element C1* is included in sub-network C*. Network elements C2 through C4 are included in sub-network C. It is noted that the network elements having an * indicates that they are integrated into "DSNE" 1401. Thus, the new single "DSNE" 1402 includes DSNE 1402 and NEs A1* B1* and C1*.

FIG. 19 shows a table of identity information distributed by DSNE 1402, in accordance with the principles of the invention, to network element A1*. It is noted that the identity and name of network element A1* is only shared with DSNE 1402. Network element A1* appears transparent to network elements A2 and A3 of sub-network A from an Operations, Administration, Maintenance and Provisioning (OAM&P) perspective.

FIG. 20 shows a table of identity information distributed by DSNE 1402 via network element A1* and, hence, "DSNE" 1401 of FIG. 14 to network elements A2 and A3 of sub-network A. It is noted that the network names and network addresses of the other network elements in the sub-network and DSNE 1402 are supplied to each network element in the sub-network A. "DSNE" 1401 and NEs A2 and A3 form SMSB "A".

FIG. 21 shows a table of identity information distributed by DSNE 1402, in accordance with the principles of the invention, to network element B1*. It is noted that the identity and name of network element B1* is only shared with DSNE 1402. Network element B1* appears transparent to network elements B2 through B5 of sub-network B from an Operations, Administration, Maintenance and Provisioning (OAM&P) perspective.

FIG. 22 is a table of identity information distributed by DSNE 1402 via network element B1* and, hence, "DSNE" 1401 of FIG. 14, in accordance with the principles of the invention, to network elements B2, B3, B4 and B5 of sub-network B. Again, it is noted that the network names and network addresses of the other network elements in the sub-network B and DSNE 1402 are supplied to each of the network elements. "DSNE" 1401 and NEs B2, B3, B4 and B5 form SMSB "B".

FIG. 23 shows a table of identity information distributed by DSNE 1402, in accordance with the principles of the invention, to network element C1*. It is noted that the identity and name of network element C1* is only shared with DSNE 1402. Network element C1* appears transparent to network elements C2 through C4 of sub-network C from an Operations, Administration, Maintenance and Provisioning (OAM&P) perspective.

FIG. 24 is a table of identity information distributed by DSNE 1402 via network element C1* and, hence, "DSNE" 1401 of FIG. 14, in accordance with the principles of the invention, to network elements C2, C3 and C4 of sub-network C. Again, it is noted that the network names and network addresses of the other network elements in the sub-network C and DSNE 1402 are supplied to each of the network elements. "DSNE" 1401 and NEs C2, C3 and C4 form SMSB "C".

The above-described arrangements are, of course, merely illustrative of the application of the principles of the inventions. Other arrangement may be devised by those skilled in the art without departing from the spirit or scope of the inventions. Although the arrangements are described herein in the context of telecommunications systems, it will be apparent that they are equally applicable to other types of data communications systems, for example, but not limited to, data communications between various types of computers as network elements. Additionally, it should be noted that the network elements (DSNE(s) and/or NE(s)) may interface with any desired number of other network elements.

We claim:

1. A network element for use in a digital transmission system including at least one other network element comprising:

processor means loaded with software for supporting an open standard interface (OSI) protocol stack having at least a network layer including routing protocols and an application layer including a directory distribution protocol, said OSI stack including at least one other OSI layer between said network layer and said application layer;

means for connecting said network element to one or more other network elements via a data communications channel, said data communications channel being intended to transport OSI protocol stack data;

means for utilizing said OSI routing protocols for detecting via received OSI protocol stack data that another network element has become reachable and for automatically providing an indication of said network element being reachable directly to said directory distribution protocol in said applications layer;

means for automatically obtaining network identity information from the indicated newly reachable network element using said OSI protocol stack;

means for automatically supplying network identity information network element to the newly reachable network element using said OSI protocol stack; and means for utilizing said OSI routing protocols for detecting via received OSI protocol stack data that another network element has ceased to be reachable and for automatically providing an indication of said network element ceasing to be reachable directly to said directory distribution protocol in said applications layer, an indication that said network element was reachable being removed from said routing table upon said detection that it has ceased to be reachable.

2. A network element as defined in claim 1 further including means for establishing a routing table including indications of network elements in said network layer, an indication of said network element becoming reachable being included as an entry in said routing table and means for providing direct access from said applications layer to said routing table and the entries therein in said network layer.

3. A network element as defined in claim 2 further including means for supplying said indication from said directory distribution protocol in said applications layer to a distribution manager, said distribution manager including a directory information base and means for adding identity information of newly reachable network elements to said directory information base.

4. A network element as defined in claim 1 further including means for supplying said indication from said directory distribution protocol in said applications layer to a distribution manager, said distribution manager including a directory information base and means for deleting identity information of network elements which have ceased to be reachable from said directory information base.

5. A network element as defined in claim 1 further including a directory information base and wherein said means for automatically obtaining identity information includes means responsive to reception of an indication of a newly reachable network element for sending a registration initialization request to the newly reachable network element and means for adding the received network identity information of said newly reachable network element to said directory information base.

6. A method for use in a network element to be employed in a digital transmission system including at least one other network element comprising the steps of:

supporting software including an open standard interface (OSI) protocol stack having at least a network layer including routing protocols and an application layer including a directory distribution protocol, the OSI stack including at least one other OSI layer between said network layer and said application layer;

connecting said network element to one or more other network elements via a data communications channel, said data communications channel being intended to transport OSI protocol stack data;

utilizing said OSI routing protocols for detecting via received OSI protocol stack data that another network element has become reachable and for automatically providing an indication of said network element being reachable directly to said directory distribution protocol in said applications layer;

automatically obtaining network identity information from the indicated newly reachable network element using said OSI protocol stack;

automatically supplying network identity information of this network element to the newly reachable network element using said OSI protocol stack; and utilizing said OSI routing protocols for detecting via received OSI protocol stack data that another network element has ceased to be reachable and for automatically providing an indication of said network element ceasing to be reachable directly to said directory distribution protocol in said applications layer and deleting an indication that said network element was reachable from said routing table upon said detection that it has ceased to be reachable.

7. The method as defined in claim 6 further including the steps of establishing a routing table including indications of network elements in said network layer, an indication of said network element becoming reachable, being included as an entry in said routing table and providing direct access from said applications layer to said routing table and the entries therein in said network layer.

8. The method as defined in claim 7 further including the steps of supplying said indication from said directory distribution protocol in said applications layer to a distribution manager, said distribution manager including a directory information base and adding identity information of newly reachable network elements to said directory information base.

9. The method as defined in claim 6 further including the steps of supplying said indication from said directory distribution protocol in said applications layer to a distribution manager, said distribution manager including a directory information base and deleting identity information of network elements which have ceased to be reachable from said directory information base.

10. The method as defined in claim 6 wherein said step of automatically obtaining identity information includes a step of sending, in response to reception of an indication of a newly reachable network element, a registration initialization request to the newly reachable network element and adding the received network identity information of said newly reachable network element to a directory information base.

* * * * *